(12) United States Patent
Bublitz

(10) Patent No.: US 10,603,636 B2
(45) Date of Patent: Mar. 31, 2020

(54) DESALINATION PROCESSES AND FERTILIZER PRODUCTION METHODS

(71) Applicant: XiaoLing Cheng, Jiangsu (CN)

(72) Inventor: Mark O. Bublitz, South Slocan (CA)

(73) Assignee: XiaoLing Cheng, Jiangsu (CN)

( * ) Notice: Subject to any disclaimer, the term of this patent is extended or adjusted under 35 U.S.C. 154(b) by 0 days.

(21) Appl. No.: 16/263,564

(22) Filed: Jan. 31, 2019

(65) Prior Publication Data

US 2019/0160430 A1 May 30, 2019

Related U.S. Application Data

(63) Continuation of application No. 15/915,504, filed on Mar. 8, 2018, which is a continuation of application No. PCT/US2016/050921, filed on Sep. 9, 2016.

(Continued)

(51) Int. Cl.
*B01D 61/02* (2006.01)
*C02F 9/00* (2006.01)
(Continued)

(52) U.S. Cl.
CPC ......... *B01D 61/022* (2013.01); *B01D 61/142* (2013.01); *C02F 1/001* (2013.01); *C02F 9/00* (2013.01); *C05B 7/00* (2013.01); *C05F 7/00* (2013.01); *C02F 1/004* (2013.01); *C02F 1/283* (2013.01); *C02F 1/442* (2013.01); *C02F 1/444* (2013.01); *C02F 1/5236* (2013.01); *C02F 1/66* (2013.01); *C02F 1/74* (2013.01); *C02F 2001/5218* (2013.01); *C02F 2101/10* (2013.01); *C02F 2103/08* (2013.01);
(Continued)

(58) Field of Classification Search
None
See application file for complete search history.

(56) References Cited

U.S. PATENT DOCUMENTS

| 3,042,606 A * | 7/1962 | Salutsky | C02F 5/04 210/665 |
| 2003/0205526 A1* | 11/2003 | Vuong | B01D 61/022 210/652 |

(Continued)

FOREIGN PATENT DOCUMENTS

DE 102005040018 A1 3/2007

OTHER PUBLICATIONS

"The Ionic Product of Water", pp. 1-5, accessed online Feb. 22, 2019. (Year: 2019).*

(Continued)

*Primary Examiner* — Clare M Perrin
(74) *Attorney, Agent, or Firm* — Grace J. Fishel

(57) ABSTRACT

A multistage desalination process for treatment of seawater or salt wastewater. During initially processing the seawater or salt wastewater is treated to precipitate scaling minerals as phosphates including magnesium ammonium phosphate useful as a fertilizer. During the initial phase, ammonium phosphate and sodium phosphate are added to the seawater or salt wastewater followed by an addition of ammonia and a water-based charged solvent. After separating the precipitated solids, the cleaned seawater or salt wastewater is aerated and filtered to produce potable or otherwise usable water.

7 Claims, 5 Drawing Sheets

Related U.S. Application Data

(60) Provisional application No. 62/216,163, filed on Sep. 9, 2015.

(51) Int. Cl.
*C05F 7/00* (2006.01)
*C05B 7/00* (2006.01)
*B01D 61/14* (2006.01)
*C02F 1/00* (2006.01)
*C02F 1/52* (2006.01)
*C02F 1/66* (2006.01)
*C02F 1/28* (2006.01)
*C02F 101/10* (2006.01)
*C02F 1/44* (2006.01)
*C02F 1/74* (2006.01)
*C02F 103/08* (2006.01)

(52) U.S. Cl.
CPC ......... *C02F 2305/00* (2013.01); *Y02A 20/131* (2018.01); *Y02A 40/213* (2018.01)

(56) References Cited

U.S. PATENT DOCUMENTS

2007/0102359 A1 5/2007 Lombardi
2010/0111810 A1* 5/2010 Constantz .......... B01D 53/1418
423/430

OTHER PUBLICATIONS

Brewer et al. (Scientific American, 2008, pp. 1-8). (Year: 2008).*
Mechanical Translation of DE 10 2005 040 018 A1.
Notification of Transmittal of the International Search Report and the Written Opinion of the International Searching Authority in co-pending International application No. PCT/US21016/050921.

* cited by examiner

DESALINATION PROCESSES AND FERTILIZER PRODUCTION METHODS

This application claims priority from U.S. application 62/216,163, filed Sep. 9, 2015, which is incorporated by reference herein.

BACKGROUND OF THE INVENTION

Field of the Invention

The present invention relates to multistage desalination processes having ordered impurity removal without addition of harsh chemicals. Further, the invention includes production of a useful byproduct (fertilizer) during descaling of seawater.

Brief Description of the Prior Art

Desalination of seawater is increasingly important for production of potable water in many areas of the world. Disposal of salt wastewater is also a problem. Typically, desalination processes and desalination plants utilize reverse osmosis technologies (seawater reverse osmosis, SWRO). However, since the mineral content, organic material content and pollutant content of seawater varies by location, it can be difficult to adjust any particular process for alternative locations or to utilize a single method in multiple areas having varied organic and mineral components. In some instances, high impurity content can cause plugging or scaling of the membranes utilized during reverse osmosis processing and can result in the need to use high pressure for the reverse osmosis process. Further, descaling during conventional desalination processing often utilizes harsh chemical treatment that can result in chemical waste material that must be disposed of. With salt wastewater disposal the most common disposal method is to transport the wastewater to facilities that treat and dispose of water, frequently by injection into the subsurface which can lead to serious environmental consequences. It would be desirable to develop alternative desalination processes to address the problems discussed above.

BRIEF SUMMARY OF THE INVENTION

The invention encompasses seawater and salt wastewater treatment processes that produce potable or otherwise usable water and additionally produce fertilizer material. In accordance with the invention, a desalination process includes four major stages wherein:

A first stage involves performing a phosphate precipitation process, the phosphate precipitation process including adding a first mixture comprising ammonium phosphate and sodium phosphate to seawater or salt wastewater and mixing the first mixture and the seawater or salt wastewater. After mixing the first mixture and the seawater or salt wastewater, adding a second mixture comprising ammonia and a water-based charged solvent to the seawater or salt wastewater and mixing to produce a seawater or salt wastewater mixture having a pH of greater than or equal to about 8.5.

In a second stage, the precipitated solids are collected from the seawater or salt wastewater mixture. In an embodiment the solids collection process comprises centrifugal flow. The collected solids include one or more of divalent mineral oxides, monovalent mineral oxides and magnesium ammonium phosphate.

After performing the solids collection, a third stage involves subjecting the cleaned seawater or salt wastewater to an oxidation process comprising aeration of the cleaned seawater, followed by filtration removal of solids produced during the oxidation process.

A fourth and last stage involves performing a final filtration process comprising microfiltration followed by nanofiltration of the oxidized cleaned seawater or salt wastewater to produce potable or otherwise usable water.

In some embodiments the cleaned seawater or salt wastewater is filtered after the solids collection process before it is oxidized.

The solids collected in stage 2 containing magnesium ammonium phosphate are an excellent fertilizer. The magnesium ammonium phosphate can additionally serve as a carrier for organic matter and minor elements beneficial or essential to plant growth.

The invention summarized above comprises the methods hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which.

DETAILED DESCRIPTION OF THE INVENTION

The following detailed description is merely exemplary in nature and is not intended to limit the described embodiments or the application and uses of the described embodiments. Furthermore, there is no intention to be bound by any expressed or implied theory presented in the preceding background, brief summary, drawings or the following detailed description.

The desalination processes of the invention comprise multiple process steps that can overcome many or all of the problems encountered utilizing conventional SWRO methods. In general, seawater from any location can be processed by the methodology of the invention with little or no process variation, even if the impurity content and concentrations differ between locations. Salt wastewater resulting from various industrial processes may also be processed by the methodology of the invention.

Figure 1:
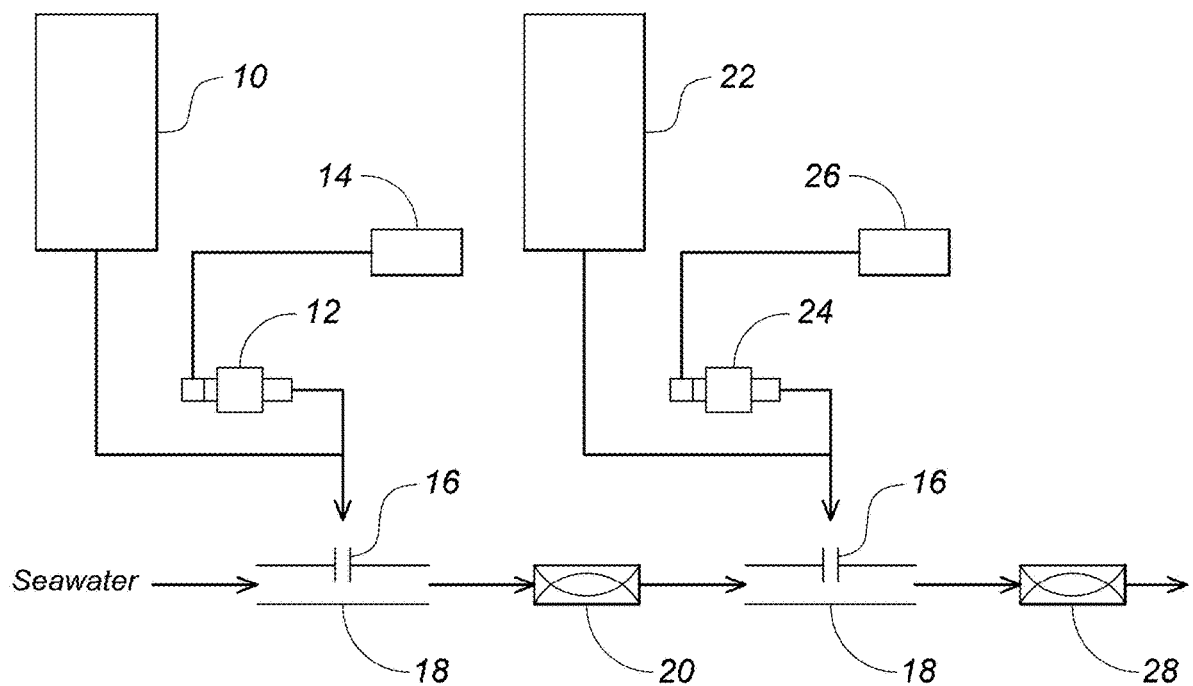
FIG. 1 is a schematic diagram illustrating a stage one precipitation phase of an inline desalination process.

The sequential process stages are described generally with reference to the accompanying drawings (FIGS. 1-4 and supporting drawings) wherein the process is illustrated as an inline process but as described in Example 1 the process may also be practiced as a batch process. Referring initially to FIG. 1, an initial processing stage with seawater is depicted. During initial processing, seawater is treated to precipitate scaling minerals as phosphates. In the phosphate precipitation process, the seawater is descaled utilizing a sequence of mixture additions and mixing of those mixture additions with the seawater.

A first mixture that is added to the seawater contains ammonium phosphate and sodium phosphate. An example amount for addition can be about 1.0 g ammonium phosphate for every 250 mg/l of magnesium present in the seawater; and about 1.0 g sodium phosphate for every 150 mg of calcium present in the seawater. The first mixture can preferably be a water solution that is added to the seawater, simultaneously with or followed by mixing of the first mixture with the seawater. The addition and mixing can be performed, for example, utilizing an inline injection system.

More particularly as shown in FIG. 1 in which one embodiment of the first stage is illustrated, an aqueous mixture of ammonium phosphate and sodium phosphate is formed in a tank 10. A pneumatic injection pump 12 connected to an air or gas supply 14 injects the mixture through a prill 16 into a pipeline 18 though which seawater is flowed. The phosphate and seawater mixture is then passed through a static mixer 20 to mix the seawater and phosphate addition thoroughly. Stage 1 then continues as described below.

After addition and mixing of the phosphate and seawater mixture, a second chemical mixture is added to produce a "seawater mixture". The second chemical mixture comprises an ammonia and a water-based charged (electromagnetic) solvent. The water-based charged solvent can be the charged solvent as described in U.S. Pat. No. 8,475,757 which is hereby incorporated by reference. As disclosed therein the water based charged solvent comprises water, alcohol and sodium hydride. Although not limited to any particular ratio, an example seawater mixture can contain 40 ml of a 7% ammonia solution and 0.25 ml of charged solvent per liter of seawater. At that ratio, the resulting seawater mixture may have a pH of greater than 8.5.

As described in U.S. Pat. No. 8,475,757 the charged solvent is formed by adding solid NaOH to solid silicon in a reaction vessel. With vigorous mixing, a first water ammonium mix is added at a concentration of two parts water ammonium mix per one part NaOH with the ammonium mix being 5% ammonium by weight. The mixture is reacted for from about 1 hour to about 2 hours at a temperature less than or equal to about 195° F. A second water ammonium mix is then added, the second water ammonium mix being 10% ammonium by weight, to maintain the temperature at or below about 195° F. until the final water ratio is 4 parts water to 1 part sodium silicate. This second mixture is reacted for from about 6 hours to about 8 hours and water is added until the density reaches about 1.3 specific gravity and then allowed to stand for about 24 hours. Alcohol is added and mixed vigorously, the reactants allowed to settle and the uppermost fraction collected for use in the subject desalination and fertilizer production methods as the water-based charged solvent.

The formation of the seawater mixture in the second stage can utilize a second inline injection system although such inline methodology is not mandatory. As shown in FIG. 1, the second chemical mixture is held in a tank 22 and is injected with a pneumatic injection pump 24 connected to an air or gas supply into pipeline 18 through which the phosphate and seawater mixture is flowed. During or after the production of the seawater mixture the seawater mixture may be passed through a static mixer 28 that creates an electric shock resulting in an increased pH. During this time, some or all divalent minerals are removed in their oxide form and magnesium ammonium phosphate precipitates in a crystal form carrying along potassium, calcium and other mineral salts. Due to the high pH of the seawater mixture, the surface tension is decreased and the oxidative corrosion is decreased. Organic and humic matter also falls out of the mixture and are included in the solids collected in a second stage, an example of which is shown in FIG. 2.

Figure 2:
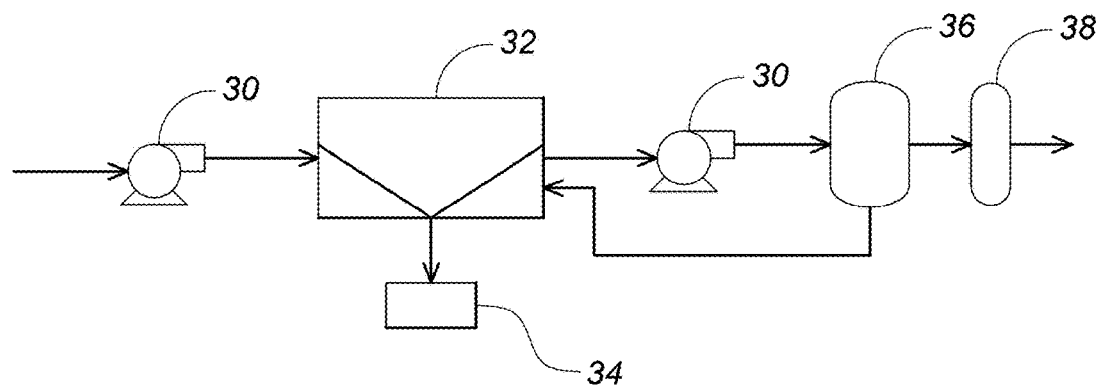
FIG. 2 is a schematic diagram illustrating a stage two separation phase.
Figure 5:
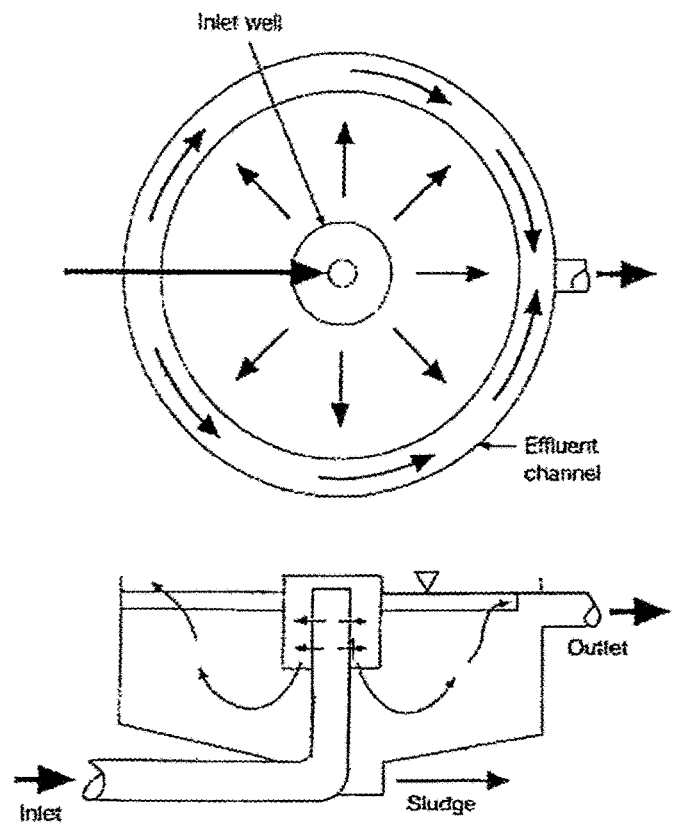
FIG. 5 is a schematic diagram of a circular basin clarifier for separating the "solids fertilizer" from the "cleaned seawater or salt wastewater"
Figure 5:
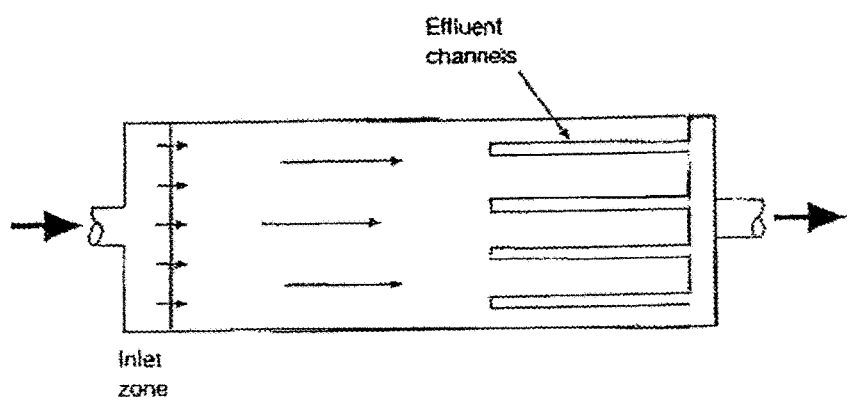
Figure 6:
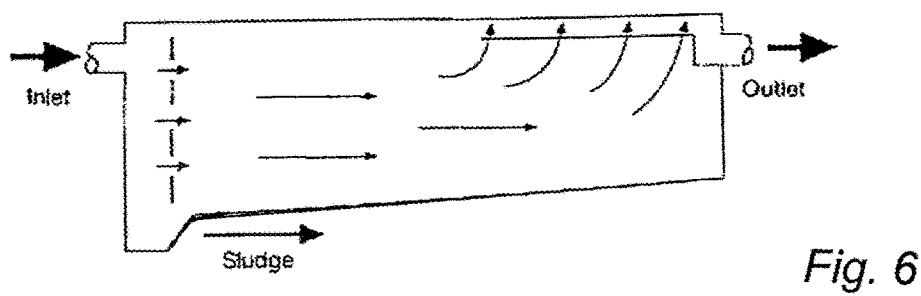
FIG. 6 is a schematic diagram of a rectangular basin clarifier.

Referring to FIG. 2 a separation process is perform in the second stage to collect solids that have precipitated from the seawater mixture. The separation can preferably be conducted utilizing an inline system. Although there exist numerous separation techniques that may be utilized during the separation processing, a preferred separation method can include an inline centrifugal flow system, representative ones of which are shown in FIG. 5 and FIG. 6. An underflow removal system can be beneficial for large-scale separation. As shown in FIG. 2, the seawater mixture is pumped 30 into a clarifier 32. A solids fraction 34 is collected and the supernate may be passed through a sand filter 36 designed with a back flush to the clarifier. The water may then passed through an activated carbon filter, clinoptilolite filter or the like 38 to remove any hydrocarbon and free ammonia that is still carried with the seawater to produce a "cleaned seawater" that does not clog, scale or cake and is non-corrosive. The solids fraction 34 is useful as a fertilizer and the "cleaned seawater" may be further processed. Larger amounts of fertilizer may be harvested by increasing (e.g., doubling) the amount of ammonium phosphate to 2.0 g for every 250 mg/l magnesium present in the seawater and the amount of sodium phosphate to 2.0 g for every 150 mg/l of calcium present in the seawater.

Because of its low solubility, the "solids fertilizer" collected in stage 2 is a slow release fertilizer, the release of which can be further controlled by granular size unlike conventional water soluble fertilizers. The "solids fertilizer" does not leach from sandy or porous soils even with over watering or heavy rain. Because of this property, several years supply of fertilizer may be applied when planting reducing labor costs. Further benefits include placing the "solids fertilizer" adjacent to the bare roots of plants without danger of burning or damaging the plants. Accurate placement of the fertilizer next to the roots also encourages rapid growth of the plants without fertilizing the weeds. Past testing has also shown that there is less need for herbicides and insecticides.

Figure 3:
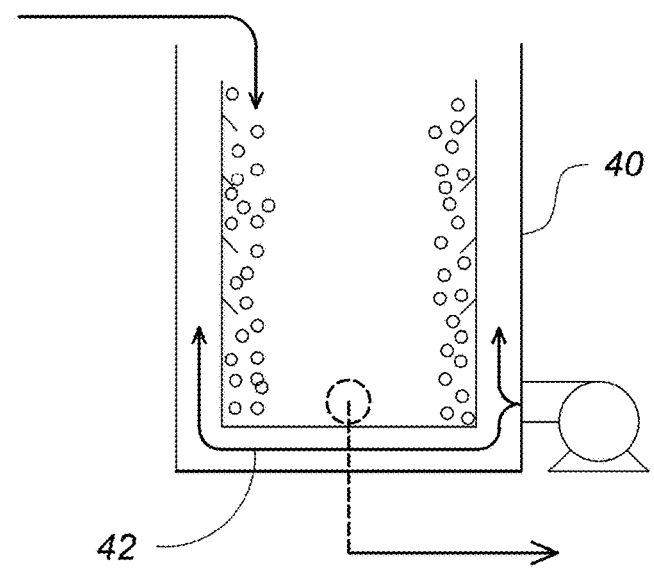
FIG. 3 is a schematic diagram illustration a stage three aeration phase.

Stage 3 of the desalination process involves subsequent processing of the cleaned seawater as depicted in FIG. 3. As shown an aeration/oxidation treatment is performed in a tank 40 preferably with an open top with air lifts 42 for circulation and oxidation of impurities within the cleaned seawater with air or an inert gas. By increasing the oxygen content of the cleaned seawater, the carbon oxygen demand (COD), volatile oxygen compounds (VOCs) and biochemical oxygen demand (BOD) may be reduced, as well as oxidizing out any iron, manganese, arsenic or other oxidizable contaminant. Optionally carbon dioxide or hydrogen peroxide may be injected if needed for further removal of troublesome contaminants. The oxidized contaminants may be removed from the cleaned seawater utilizing one or both a second carbon filter and a Chaff filter (not shown).

Figure 4:
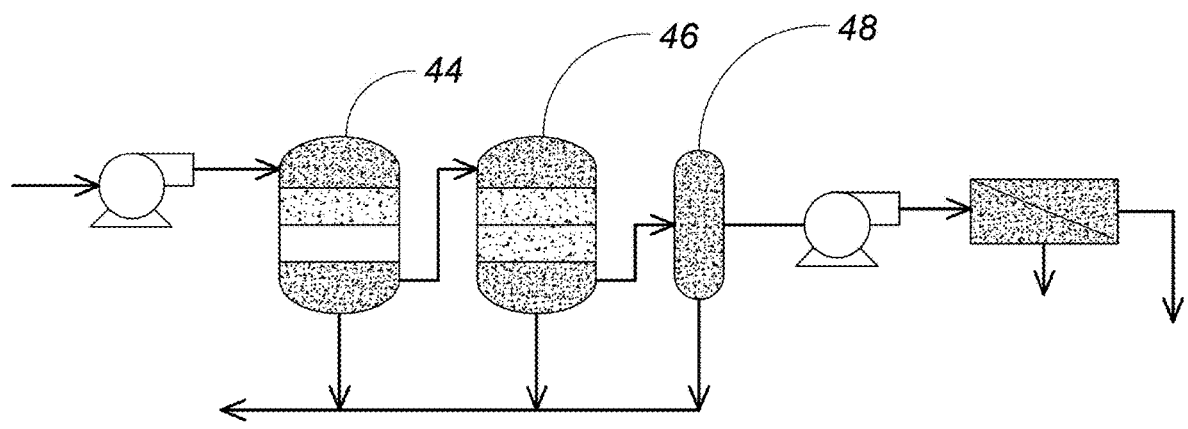
FIG. 4 is a schematic diagram illustrating a stage four final filtration phase.

The cleaned seawater may then be filtered as shown in FIG. 4. The filtration process can include micro-filtration followed by nano-filtration of the cleaning seawater to produce purified (potable) water. Preferably, the entire filtration processing is conducted at a pressure of less than or equal to 250 psi. The micro-filtration can utilize one or more filtration media. For example, the micro-filtration may utilize a first "dual media" micro-filtration process through a first micro-filter 44 followed by a sand filtration media 46 through a second micro-filter (not shown), and a subsequent carbon filtration media 48 through a third micro-filter (not shown). The three micro-filters can preferably be inline with filtration waste from each of the micro-filters being recycled back into the aeration tank 40.

The micro-filtered water can then be passed through a nano-filtration system. The micro-filtered water is correctly charged for ion removal during nano-filtration, has no suspended solids or scaling components that can clog the nano-filter(s), and contains no components that can chemically damage the nano-filter(s). Further, the surface tension of the micro-filtered water has been reduced (relative to the original seawater) and has no corrosive properties. Accordingly, in contrast with conventional desalination processes, the nano-filtration process of the present invention can be conducted under low pressure (less than or equal to about 250 psi.)

The nano-filtration processing can utilize one or more nano-filtration units each comprising one or more nano-filters (same or differing pore sizes, materials, etc.). The resulting nano-filtered water can be purified to total dissolved solids (TDS) content of less than or equal to 800 ppm. The resulting product is potable and the methodology is streamlined and cost effective due to the decreased pressurization relative to conventional methodology and non-utilization of expensive reverse osmosis membranes. Further, the amount of brine (waste) from the system (collected from the nano-filtration processing) is dramatically decreased relative to alternative technologies and is therefore relatively inexpensive to dispose of. Accordingly the methodology of the invention is much more efficient and cost effective than alternative systems.

The following examples illustrate the invention.

Example 1

A fertilizer was extracted from seawater from the Yellow Sea as follows:

Step 1

From 1500 ml of unfiltered seawater were 500 ml was reserved as "seawater before sample".

Step 2

Four grams of ammonium phosphate and 2 g of sodium phosphate were mixed with 1000 ml of seawater until the phosphate salts were completely dissolved.

Step 3

A premix of 950 ml distilled water with 30 ml of 30% ammonium hydroxide was formed to which 20 ml of a water-based charged solvent as described in U.S. Pat. No. 8,475,757 was added.

Step 4

All of the mixture from step 2 was combined with 40 ml of the mixture from step 3 and stirred until completely mixed.

Step 5

The solids were allowed to settle out and were separated from the "seawater after sample".

Step 6

The solids were rinsed with water and dried for use as a fertilizer.

Figure 7:
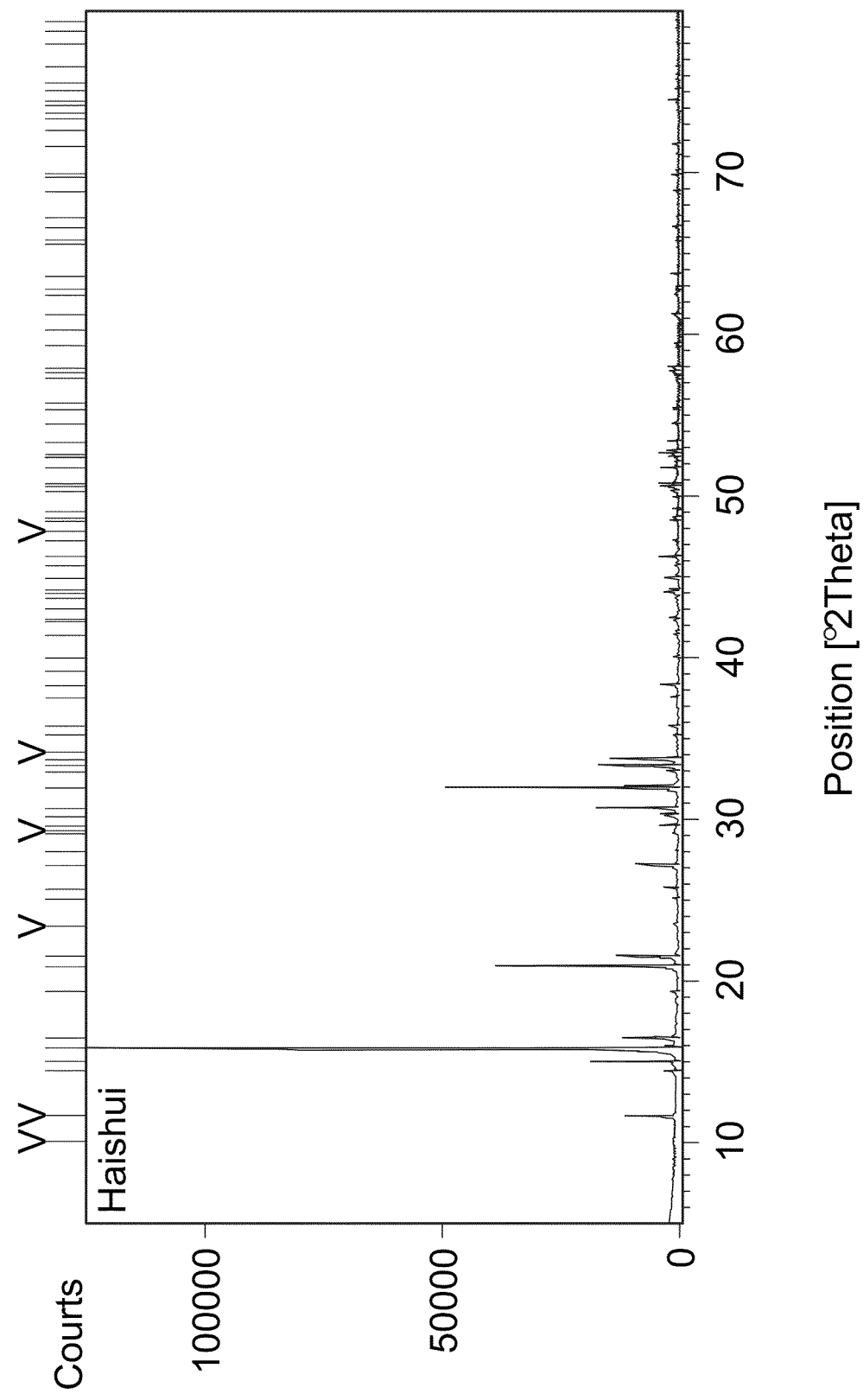
FIG. 7 is a mass spectrograph of "solids fertilizer" sample ID 1402101; and, FIG. 8 is a micrograph taken at 2 kx (2,000×) of "solids fertilizer" sample ID 1402101.
Figure 8:
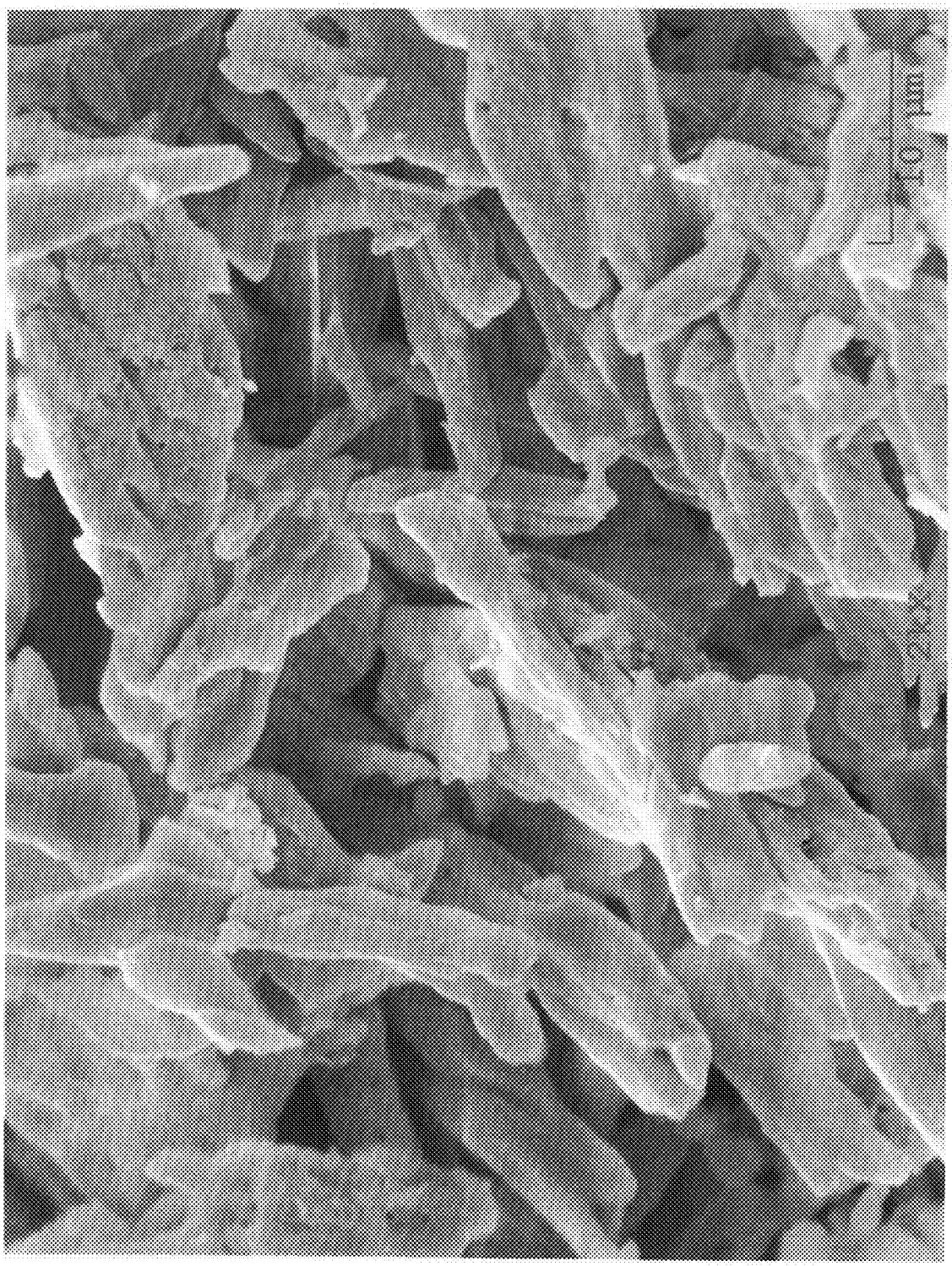

The "solids fertilizer" (1402101), "seawater before sample" (1402099) and the "seawater after sample" (1402100) were subjected to inductively coupled plasma mass spectrometry (ICP-MS), the results of which are shown in Table I. A mass spectrometry analysis of the "solids fertilizer" ID 1402101 is shown in FIG. 7 and a micrograph of the "solids fertilizer" showing its crystalline structure is shown in FIG. 8.

TABLE I

| | $\rho(B)/(mg/L)$ | | | | | | | | | |
|---|---|---|---|---|---|---|---|---|---|---|
| | Ca | K | Mg | Na | Si | S | P | Li | B | Sr |
| 1402099 | 378 | 265 | 1294 | 9072 | 9.65 | 896 | 448 | 0.19 | 4.02 | 6.20 |
| 1402100 | 33.8 | 229 | 35.6 | 8920 | 17.1 | 812 | 1185 | 0.20 | 3.72 | 0.18 |

| | $\rho(B)/(\mu g/L)$ | | | | | | | | |
|---|---|---|---|---|---|---|---|---|---|
| | Be | Zr | Mo | Ag | Cd | I | Ba | Tl | Pb |
| 1402099 | 2.00 | 1.00 | 12.0 | 4.00 | 1.00 | <1 | 130 | <0.1 | 1.00 |
| 1402100 | 6.00 | 8.00 | 86.0 | 6.00 | 1.00 | <1 | <50 | <0.1 | 1.00 |

| | $\rho(B)/(\mu g/L)$ | | | | | | | | |
|---|---|---|---|---|---|---|---|---|---|
| | Ni | Cu | Zn | Te | Se | Sb | Bi | As | Hg |
| 1402099 | <40 | 23.0 | 6740 | <0.2 | <0.1 | 0.18 | <0.2 | 1.05 | <0.05 |
| 1402100 | <40 | 6.00 | <50 | <0.2 | <0.1 | 3.35 | <0.2 | <0.5 | <0.05 |

| | $\rho(B)/(\mu g/L)$ | | | | | | | |
|---|---|---|---|---|---|---|---|---|
| | Al | Bi | Th | U | Ti | V | Cr | Mn | Co |
| 1402099 | 263 | <1 | <0.1 | <0.1 | <20 | <10 | 2.00 | 14.0 | 6.00 |
| 1402100 | 3555 | <1 | <0.1 | <0.1 | <20 | 16.0 | <1 | 12.0 | 3.00 |

| | $\omega(B)/10^{-6}$ | | | | | | | | | | |
|---|---|---|---|---|---|---|---|---|---|---|---|
| | Ca | K | Mg | Na | Si | S | P | Li | B | Sr | Al | Mn |
| 1402101 | 54800 | 555 | 162000 | 608 | 245 | 390 | 217000 | 0.93 | 131 | 799 | 28.9 | 1.08 |

Example 2

The same procedure as described in Example 1 was done with seawater from the Pacific Ocean off the shores of southern Canada. The "seawater before sample" (4030973-01), "seawater after sample" (4030973-02) and "solids fertilizer" (4030973-03) were subjected to analysis:

| Analysis Description | Method of Reference (*= modified from) Preparation | Analysis |
|---|---|---|
| Hardness as CaCO3 (CALC) | N/A | APHA 2340 B |
| Moisture | N/A | ASTM D2216 (2010) |
| Nitrate-N in Water by IC | N/A | APHA 4110 B |
| Nitrate-N, Water-Soluble | Carter 15.2.2 | APHA 4110 B |
| Nitrate-N in Water by IC | N/A | APHA 4110 B |
| Nitrate-N, Water-Soluble by IC | Carter 15.2.2 | APHA 4110 B |
| pH in Solids | N/A | EPA 9045D (2004) |
| pH in Water | N/A | APHA 4500-H + B |
| Sample Dry (60 C.) and Sieve (2 mm) | Carter | N/A |
| Strong Acid Leachable Metals | EPA 3050B* | EPA 6020A (2007) |
| Total Dissolved Solids (GRAV) | N/A | APHA 2540 C |
| Total Kjeldahl Nitrogen | N/A | EPA 351.2 (1993)* |
| Total Kjeldahl Nitrogen in Solids | N/A | EPA 351.2 (1993)* |
| Told Recoverable Metals | APHA 3030E* | APHA 3125 B |

Method Reference Descriptions:
ASTM ASTM International Test Methods
APHA Standard Methods for the Examination of Water and Wastewater, American Public Health Association
Carter Soil Sampling and Methods of Analysis, Carter/Gregorich
EPA United States Environmental Protection Agency Test Methods Glossary of Terms:
MRL Method Reporting Limit
<Less than the Reported Detection Limit (RDL)—the RDL may be higher than the MRL due to various factors such as dilutions, limited sample volume, high moisture, or interferences
AO Aesthetic objective
MAC Maximum acceptable concentration (health-related guideline)
% Percent W/W
% dry Percent, reported on a dry weight basis
% wet Percent, reported on an as-received basis
mg/kg dry Milligrams per kilogram (ppm), reported on a dry weight basis
mg/L Milligrams per litre
pH units pH<7=acidic, pH>7=basic

TABLE II

Sample ID: 4030973-01 "Seawater before sample"

| Analyte | Result/Recovery | MRL/Limit | Units |
|---|---|---|---|
| General Parameters | | | |
| pH | 7.75 | 0.01 | pH units |
| Solids, Total Dissolved Calculated | 27000 | 10 | mg/L |
| Parameters | | | |
| Hardness, Total (Total as CaCO2) | 5160 | 5.0 | mg/L |
| Total Recoverable Metals | | | mg/L |
| Aluminum, total | <0.05 | 0.05 | mg/L |
| Antimony, total | <0.001 | 0.001 | mg/L |
| Arsenic, total | <0.005 | 0.005 | mg/L |
| Barium, total | <0.05 | 0.05 | mg/L |
| Beryllium, total | <0.001 | 0.001 | mg/L |
| Bismuth, total | <0.001 | 0.001 | mg/L |
| Boron, total | 3.70 | 0.04 | mg/L |
| Cadmium, total | <0.0001 | 0.0001 | mg/L |
| Calcium, total | 342 | 2.0 | mg/L |
| Chromium, total | <0.005 | 0.005 | mg/L |
| Cobalt, total | <0.0005 | 0.0005 | mg/L |
| Copper, total | <0.002 | 0.002 | mg/L |
| Iron, total | <0.10 | 0.10 | mg/L |
| Lead, total | <0.001 | 0.001 | mg/L |
| Lithium, total | 0.133 | 0.001 | mg/L |
| Magnesium, total | 1050 | 0.1 | mg/L |
| Manganese, total | 0.002 | 0.002 | mg/L |
| Mercury, total | <0.0002 | 0.0002 | mg/L |
| Molybdenum, total | 0.009 | 0.001 | mg/L |
| Nickel, total | <0.002 | 0.002 | mg/L |
| Phosphorus, total | <0.2 | 0.2 | mg/L |
| Potassium, total | 326 | 0.2 | mg/L |
| Selenium, total | <0.005 | 0.005 | mg/L |
| Silicon, total | <5 | 5 | mg/L |
| Silver, total | <0.0005 | 0.0005 | mg/L |
| Sodium, total | 8580 | 0.2 | mg/L |
| Strontium, total | 6.85 | 0.01 | mg/L |
| Sulfur, total | 830 | 10 | mg/L |
| Tellurium, total | <0.002 | 0.002 | mg/L |
| Thallium, total | <0.0002 | 0.0002 | mg/L |
| Thorium, total | <0.001 | 0.001 | mg/L |
| Tin, total | <0.002 | 0.002 | mg/L |
| Titanium, total | <0.05 | 0.05 | mg/L |
| Uranium, total | 0.0024 | 0.0002 | mg/L |
| Vanadium, total | <0.01 | 0.01 | mg/L |
| Zinc, total | <0.04 | 0.04 | mg/L |
| Zirconium, total | <0.001 | 0.001 | mg/L |

TABLE III

Sample ID: 4030973-02 "Seawater after sample"

| Analyte | Result/Recovery | MRL/Limit | Units |
|---|---|---|---|
| Anions | | | |
| Nitrogen, Nitrate as N | 1.08 | 0.010 | mg/L |
| Nitrogen, Nitrite as N | <0.100 | 0.010 | mg/L |
| General Parameters | | | |
| Nitrogen, Total Kjeldahl | 1040 | 0.05 | mg/L |
| pH | 8.88 | 0.01 | pH units |
| Solids, Total Dissolved | 21600 | 10 | mg/L |
| Calculated Parameters | | | |
| Hardness, Total (Total as CaCO2) | 622 | 5.0 | mg/L |
| Nitrogen, Nitrate + Nitrite as N | 1.08 | 1.00 | mg/L |
| Nitrogen, total Total Recoverable | 1040 | 50.0 | mg/L |

TABLE III-continued

Sample ID: 4030973-02 "Seawater after sample"

| Analyte | Result/Recovery | MRL/Limit | Units |
| --- | --- | --- | --- |
| Metals | | | |
| Aluminum, total | <0.05 | 0.05 | mg/L |
| Antimony, total | 0.001 | 0.001 | mg/L |
| Arsenic, total | <0.005 | 0.005 | mg/L |
| Barium, total | <0.05 | 0.05 | mg/L |
| Beryllium, total | <0.001 | 0.001 | mg/L |
| Bismuth, total | <0.001 | 0.001 | mg/L |
| Boron, total | 2.43 | 0.04 | mg/L |
| Cadmium, total | 0.0001 | 0.0001 | mg/L |
| Calcium, total | 136 | 2.0 | mg/L |
| Chromium, total | <0.005 | 0.005 | mg/L |
| Cobalt, total | <0.0005 | 0.0005 | mg/L |
| Copper, total | 0.006 | 0.002 | mg/L |
| Iron, total | <0.10 | 0.10 | mg/L |
| Lead, total | <0.001 | 0.001 | mg/L |
| Lithium, total | 0.110 | 0.001 | mg/L |
| Magnesium, total | 68.3 | 0.1 | mg/L |
| Manganese, total | 0.003 | 0.002 | mg/L |
| Mercury, total | <0.0002 | 0.0002 | mg/L |
| Molybdenum, total | 0.014 | 0.001 | mg/L |
| Nickel, total | <0.002 | 0.002 | mg/L |
| Phosphorus, total | 2.7 | 0.2 | mg/L |
| Potassium, total | 271 | 0.2 | mg/L |
| Selenium, total | <0.005 | 0.005 | mg/L |
| Silicon, total | 34 | 5 | mg/L |
| Silver, total | <0.0005 | 0.0005 | mg/L |
| Sodium, total | 7530 | 0.2 | mg/L |
| Strontium, total | 2.86 | 0.01 | mg/L |
| Sulfur, total | 700 | 10 | mg/L |
| Tellurium, total | <0.002 | 0.002 | mg/L |
| Thallium, total | <0.0002 | 0.0002 | mg/L |
| Thorium, total | <0.001 | 0.001 | mg/L |
| Tin, total | <0.002 | 0.002 | mg/L |
| Titanium, total | <0.05 | 0.05 | mg/L |
| Uranium, total | 0.0004 | 0.0002 | mg/L |
| Vanadium, total | <0.01 | 0.01 | mg/L |
| Zinc, total | <0.04 | 0.04 | mg/L |
| Zirconium, total | <0.001 | 0.001 | mg/L |

TABLE IV

Sample ID: 4030973-03 "Solids Fertilizer"

| Analyte | Result/Recovery | MRL/Limit | Units |
| --- | --- | --- | --- |
| General Parameters | | | |
| Moisture | 37.4 | 0.1 | % wet |
| Nitrate as N, Water Soluble | 3.23 | 0.05 | mg/kg dry |
| Nitrite as N, Water Soluble | <0.10 | 0.05 | mg/kg dry |
| Nitrogen, Total Kjeldahl | 7.24 | 0.01 | % dry |
| pH | 7.4 | 0.1 | pH units |
| Calculated Parameters | | | |
| Nitrogen, total | 7.24 | 0.01 | % |
| Strong Acid Leachable Metals | | | |
| Aluminum | 65 | 20 | mg/kg dry |
| Antimony | 0.2 | 0.1 | mg/kg dry |
| Arsenic | <0.4 | 0.4 | mg/kg dry |
| Barium | 2 | 1 | mg/kg dry |
| Beryllium | <0.1 | 0.1 | mg/kg dry |
| Bismuth | <0.1 | 0.1 | mg/kg dry |
| Boron | 58 | 2 | mg/kg dry |
| Cadmium | <0.04 | 0.04 | mg/kg dry |
| Calcium | 15000 | 100 | mg/kg dry |
| Chromium | 1 | 1 | mg/kg dry |

TABLE IV-continued

Sample ID: 4030973-03 "Solids Fertilizer"

| Analyte | Result/Recovery | MRL/Limit | Units |
| --- | --- | --- | --- |
| Cobalt | 0.4 | 0.1 | mg/kg dry |
| Copper | 1.3 | 0.2 | mg/kg dry |
| Iron | 160 | 20 | mg/kg dry |
| Lead | <0.2 | 0.2 | mg/kg dry |
| Lithium | 0.3 | 0.1 | mg/kg dry |
| Magnesium | 87000 | 10 | mg/kg dry |
| Manganese | 3.8 | 0.4 | mg/kg dry |
| Mercury | <0.05 | 0.05 | mg/kg dry |
| Molybdenum | 0.1 | 0.1 | mg/kg dry |
| Nickel | 0.5 | 0.4 | mg/kg dry |
| Phosphorus | 12000 | 10 | mg/kg dry |
| Potassium | 1500 | 10 | mg/kg dry |
| Selenium | <0.5 | 0.5 | mg/kg dry |
| Silicon | <3000 | 3000 | mg/kg dry |
| Silver | <0.2 | 0.2 | mg/kg dry |
| Sodium | 20000 | 40 | mg/kg dry |
| Strontium | 280 | 0.2 | mg/kg dry |
| Sulfur | 2100 | 1000 | mg/kg dry |
| Tellurium | <0.1 | 0.1 | mg/kg dry |
| Thallium | <0.1 | 0.1 | mg/kg dry |
| Thorium | <0.5 | 0.5 | mg/kg dry |
| Tin | <0.2 | 0.2 | mg/kg dry |
| Titanium | 15 | 2 | mg/kg dry |
| Uranium | 0.4 | 0.1 | mg/kg dry |
| Vanadium | 0.7 | 0.4 | mg/kg dry |
| Zinc | 4 | 2 | mg/kg dry |
| Zirconium | <2 | 2 | mg/kg dry |

The agronomic properties of the "solids fertilizer" collected in examples 1 and 2 are remarkable. It contains an average of 8-10% magnesium or higher depending on the magnesium content of the seawater. Magnesium is involved in chlorophyll production and the extra magnesium in the fertilizer helps plants produce chlorophyll in lower light situations (both intensity and duration) which boosts plant growth. In addition the "solids fertilizer" is a carrier for other minor elements beneficial or essential to plant growth such as potassium.

As various changes could be made in the methods described above without departing from the scope of the invention, it is intended that all matter contained in the above description or shown in the accompanying drawings shall be interpreted as illustrative and not in a limiting sense.

What is claimed:

1. A seawater or salt wastewater desalination process comprising:
   forming a water-based charged solvent comprising;
      providing solid silicon in a reaction vessel;
      adding solid NaOH;
      with mixing, adding a first water ammonium mix to a concentration of two parts by volume water ammonium mix per one part NaOH, the water ammonium mix being 5% amount by mole weight;
      reacting for from about 1 hour to about 2 hours at less than or equal to about 195 degrees F.;
      adding a second water ammonium mix, the second water ammonium mix being 10% ammonium by mole weight and being added to maintain the temperature at or below about 195 degrees F. until a final water ratio of 4 parts water by volume to 1 part sodium hydroxide is reached;
   reacting for from about 6 hours to about 8 hours;
   adding water until the density reaches about 1.3 specific gravity;
   allowing to stand for about 24 hours;
   adding an alcohol and mixing;
   allowing to settle; and
   collecting an uppermost fraction as the water-based charged solvent;

performing a phosphate precipitation process, the phosphate precipitation process including adding a first mixture comprising ammonium phosphate and sodium phosphate to seawater or salt wastewater and mixing the first mixture and the seawater or salt wastewater;

after mixing the first mixture and the seawater or salt wastewater, adding a second mixture comprising ammonia and the water-based charged solvent to the seawater or salt wastewater and mixing to produce a seawater or salt wastewater mixture having a pH of greater than or equal to about 8.5;

performing a solids collection process to collect precipitated solids from the seawater or salt wastewater mixture, the solids including magnesium ammonium phosphate;

after performing the solids collection, performing an oxidation process comprising aeration of the seawater or salt wastewater mixture; and performing a final filtration process comprising microfiltration followed by nano-filtration of the seawater or salt wastewater to produce potable water, wherein a surface tension of the micro-filtered water has been reduced relative to the original seawater or salt wastewater and has substantially no corrosive properties.

2. The desalination process of claim 1 further comprising filtering the seawater or salt wastewater mixture after the solids collection process and before the oxidation process.

3. The desalination process of claim 2 wherein the filtration comprises filtration through sand followed by carbon filtration.

4. A fertilizer production process comprising:
forming a water-based charged solvent comprising;
providing solid silicon in a reaction vessel;
adding solid NaOH;
with mixing, adding a first water ammonium mix to a concentration of two parts by volume water ammonium mix per one part NaOH, the water ammonium mix being 5% amount by mole weight;
reacting for from about 1 hour to about 2 hours at less than or equal to about 195 degrees F.;
adding a second water ammonium mix, the second water ammonium mix being 10% ammonium by mole weight and being added to maintain the temperature at or below about 195 degrees F. until a final water ratio of 4 parts water by volume to 1 part sodium hydroxide is reached;
reacting for from about 6 hours to about 8 hours;
adding water until the density reaches about 1.3 specific gravity;
allowing to stand for about 24 hours;
adding an alcohol and mixing;
allowing to settle; and
collecting an uppermost fraction as the water-based charged solvent;

performing a phosphate precipitation process, the phosphate precipitation process including adding a first mixture comprising ammonium phosphate and sodium phosphate to seawater or salt wastewater and mixing the first mixture and the seawater or salt wastewater;

after mixing the first mixture and the seawater or salt wastewater, adding a second mixture comprising ammonia and the water-based charged solvent to the seawater or salt wastewater and mixing to produce a seawater or salt wastewater mixture having a pH of greater than or equal to about 8.5, said seawater or salt wastewater mixture having a reduced surface tension relative to the original seawater or salt waste water and the oxidative corrosion is decreased;

performing a solids collection process to collect precipitated solids from the seawater or salt wastewater mixture, the solids including magnesium ammonium phosphate.

5. The fertilizer production process of claim 4 wherein the fertilizer product further comprises organic matter.

6. The fertilizer production process of claim 4 wherein the solids additionally contain potassium and calcium salts.

7. The fertilizer production process of claim 4 wherein a seawater or salt wastewater is selected for processing such that the solids contain from about 8 to 20% by weight magnesium.

\* \* \* \* \*